United States Patent
Vincent et al.

(10) Patent No.: US 8,709,629 B2
(45) Date of Patent: Apr. 29, 2014

(54) SYSTEMS AND METHODS FOR REDOX FLOW BATTERY SCALABLE MODULAR REACTANT STORAGE

(75) Inventors: Colin Earl MacKenzie Vincent, Vancouver (CA); Gary Lepp, North Vancouver (CA)

(73) Assignee: JD Holding Inc., George Town (KY)

( * ) Notice: Subject to any disclaimer, the term of this patent is extended or adjusted under 35 U.S.C. 154(b) by 722 days.

(21) Appl. No.: 12/975,709

(22) Filed: Dec. 22, 2010

(65) Prior Publication Data

US 2012/0164498 A1 Jun. 28, 2012

(51) Int. Cl.
*H01M 2/38* (2006.01)

(52) U.S. Cl.
USPC .................. 429/80; 429/51; 429/63; 429/70; 429/72; 429/101; 429/105; 429/163; 429/454; 429/455; 429/456; 429/462; 429/507; 137/260

(58) Field of Classification Search
CPC ...................... H01M 8/04201; H01M 8/04208; H01M 8/188; H01M 8/18; H01M 8/20; H01M 8/2475
USPC ........... 429/51, 63, 70, 72, 80, 101, 105, 163, 429/454, 455, 456, 462, 507; 137/260
See application file for complete search history.

(56) References Cited

U.S. PATENT DOCUMENTS

| | | | |
|---|---|---|---|
| 3,279,949 A | 10/1966 | Schaefer et al. | |
| 3,530,003 A | 9/1970 | Warszawski et al. | |
| 3,666,561 A | 5/1972 | Chiku | |
| 3,996,064 A * | 12/1976 | Thaller | 320/128 |
| 4,018,508 A | 4/1977 | McDermott et al. | |
| 4,181,777 A | 1/1980 | Spaziante | |
| 4,287,465 A | 9/1981 | Godard et al. | |
| 4,312,735 A | 1/1982 | Grimes et al. | |
| 4,362,791 A | 12/1982 | Kaneko et al. | |
| 4,371,433 A | 2/1983 | Balko et al. | |

(Continued)

FOREIGN PATENT DOCUMENTS

| | | |
|---|---|---|
| AT | 509 888 A4 | 12/2011 |
| AU | 55562/86 A | 8/1987 |

(Continued)

OTHER PUBLICATIONS

Sheri Nevins, et al., Article entitled "Flow Battery Solution for Smart Grid Renewable Energy Applications", Ktech Corporation, 2010 DOE Energy Storage Program Review, Nov. 10, 2010 (14 pgs.).

(Continued)

*Primary Examiner* — Ula C Ruddock
*Assistant Examiner* — Amanda Barrow
(74) *Attorney, Agent, or Firm* — John R. Thompson; Stoel Rives LLP

(57) ABSTRACT

Disclosed herein are various embodiments of redox flow battery systems having modular reactant storage capabilities. Accordingly to various embodiments, a redox flow battery system may include an anolyte storage module configured to interface with other anolyte storage modules, a catholyte storage module configured to interface with other catholyte storage modules, and a reactor cell having reactant compartments in fluid communication with the anolyte and catholyte storage modules. By utilizing modular storage modules to store anolyte and catholyte reactants, the redox flow battery system may be scalable without significantly altering existing system components.

19 Claims, 7 Drawing Sheets

(56) References Cited

U.S. PATENT DOCUMENTS

| | | | |
|---|---|---|---|
| 4,410,606 A | 10/1983 | Loutfy et al. | |
| 4,786,567 A * | 11/1988 | Skyllas-Kazacos et al. | 429/51 |
| 4,797,566 A | 1/1989 | Nozaki et al. | |
| 4,908,281 A | 3/1990 | O'Callaghan | |
| 4,927,509 A | 5/1990 | Mathur et al. | |
| 4,956,244 A | 9/1990 | Shimizu et al. | |
| 5,225,712 A | 7/1993 | Erdman | |
| 5,250,158 A | 10/1993 | Kaneko et al. | |
| 5,308,718 A | 5/1994 | Eidler et al. | |
| 5,318,865 A | 6/1994 | Kaneko et al. | |
| 5,368,762 A | 11/1994 | Sato et al. | |
| 5,484,666 A | 1/1996 | Gibb et al. | |
| 5,486,430 A | 1/1996 | Gorbell et al. | |
| 5,512,787 A | 4/1996 | Dederick | |
| 5,587,132 A | 12/1996 | Nakajima et al. | |
| 5,601,943 A | 2/1997 | Eidler et al. | |
| 5,656,390 A | 8/1997 | Kageyama et al. | |
| 5,665,212 A | 9/1997 | Zhong et al. | |
| 5,734,255 A | 3/1998 | Thompson et al. | |
| 5,759,711 A | 6/1998 | Miyabayashi et al. | |
| 5,851,694 A | 12/1998 | Miyabayashi et al. | |
| 6,143,443 A | 11/2000 | Kazacos et al. | |
| 6,219,623 B1 | 4/2001 | Wills | |
| 6,242,125 B1 | 6/2001 | Eidler et al. | |
| 6,261,714 B1 * | 7/2001 | Eidler et al. | 429/70 |
| 6,414,653 B1 | 7/2002 | Kobayashi | |
| 6,416,653 B1 | 7/2002 | Barben, II et al. | |
| 6,461,772 B1 | 10/2002 | Miyake et al. | |
| 6,468,688 B2 | 10/2002 | Kazacos et al. | |
| 6,475,661 B1 * | 11/2002 | Pellegri et al. | 429/105 |
| 6,519,041 B1 | 2/2003 | Berthold | |
| 6,524,452 B1 | 2/2003 | Clark et al. | |
| 6,544,679 B1 | 4/2003 | Petillo et al. | |
| 6,555,267 B1 | 4/2003 | Broman et al. | |
| 6,558,833 B2 * | 5/2003 | McCoy | 429/70 |
| 6,562,514 B1 | 5/2003 | Kazacos et al. | |
| 6,563,234 B2 | 5/2003 | Hasegawa et al. | |
| 6,609,081 B1 | 8/2003 | de Varennes et al. | |
| 6,613,298 B2 | 9/2003 | Tanaka et al. | |
| 6,670,721 B2 | 12/2003 | Lof et al. | |
| 6,680,547 B1 | 1/2004 | Dailey | |
| 6,761,945 B1 | 7/2004 | Adachi et al. | |
| 6,764,789 B1 | 7/2004 | Sekiguchi et al. | |
| 6,809,431 B1 | 10/2004 | Schippmann | |
| 6,858,953 B2 | 2/2005 | Stahlkopf | |
| 6,875,535 B2 | 4/2005 | Ye et al. | |
| 6,916,579 B2 | 7/2005 | Gorchkov et al. | |
| 7,052,796 B2 | 5/2006 | Sabin et al. | |
| 7,061,205 B2 | 6/2006 | Shigematsu et al. | |
| 7,078,123 B2 | 7/2006 | Kazacos et al. | |
| 7,083,875 B2 | 8/2006 | Lillis et al. | |
| 7,181,183 B1 | 2/2007 | Hennessy | |
| 7,184,903 B1 | 2/2007 | Williams et al. | |
| 7,199,550 B2 | 4/2007 | Tsutsui et al. | |
| 7,220,515 B2 | 5/2007 | Ito et al. | |
| 7,227,275 B2 | 6/2007 | Hennessy et al. | |
| 7,258,947 B2 | 8/2007 | Kubata et al. | |
| 7,265,456 B2 | 9/2007 | Hennessy | |
| 7,353,083 B2 | 4/2008 | Hennessy | |
| 7,361,427 B1 | 4/2008 | Dow et al. | |
| 7,389,189 B2 | 6/2008 | Williams et al. | |
| 7,517,608 B2 | 4/2009 | Brereton et al. | |
| 7,682,728 B2 | 3/2010 | Harper | |
| 7,687,193 B2 | 3/2010 | Harper | |
| 7,704,634 B2 | 4/2010 | Deguchi et al. | |
| 7,740,977 B2 | 6/2010 | Lepp et al. | |
| 8,026,013 B2 | 9/2011 | Valensa et al. | |
| 8,048,555 B2 | 11/2011 | Darcy et al. | |
| 8,277,964 B2 | 10/2012 | Hennessy | |
| 2001/0028977 A1 | 10/2001 | Kazacos et al. | |
| 2003/0087156 A1 | 5/2003 | Broman et al. | |
| 2003/0143456 A1 * | 7/2003 | Kazacos et al. | 429/105 |
| 2004/0036360 A1 | 2/2004 | McCombs | |
| 2004/0044442 A1 | 3/2004 | Bayoumi et al. | |
| 2004/0113431 A1 | 6/2004 | Huang | |
| 2004/0121204 A1 | 6/2004 | Adelman et al. | |
| 2004/0151953 A1 | 8/2004 | Kirk et al. | |
| 2004/0158417 A1 | 8/2004 | Bonet | |
| 2004/0169493 A1 * | 9/2004 | Tsutsui et al. | 320/128 |
| 2004/0172943 A1 | 9/2004 | Buelow et al. | |
| 2004/0191623 A1 | 9/2004 | Kubata et al. | |
| 2004/0241544 A1 | 12/2004 | Nakaishi et al. | |
| 2005/0004716 A1 | 1/2005 | Lillis et al. | |
| 2005/0012395 A1 | 1/2005 | Eckroad et al. | |
| 2005/0074665 A1 | 4/2005 | Spaziante et al. | |
| 2005/0077252 A1 | 4/2005 | Shih et al. | |
| 2005/0147871 A1 | 7/2005 | Shigematsu et al. | |
| 2005/0156432 A1 | 7/2005 | Hennessy | |
| 2005/0158614 A1 | 7/2005 | Hennessy | |
| 2005/0158615 A1 * | 7/2005 | Samuel et al. | 429/81 |
| 2006/0142899 A1 | 6/2006 | Wobben | |
| 2006/0171086 A1 | 8/2006 | Hennessy et al. | |
| 2006/0273595 A1 | 12/2006 | Avagliano et al. | |
| 2007/0001461 A1 | 1/2007 | Hopewell | |
| 2007/0035135 A1 | 2/2007 | Yoshida | |
| 2007/0072067 A1 | 3/2007 | Symons et al. | |
| 2007/0202385 A1 | 8/2007 | Minamiura et al. | |
| 2007/0258784 A1 * | 11/2007 | Looker | 410/52 |
| 2008/0081247 A1 | 4/2008 | Nakaishi et al. | |
| 2008/0182157 A1 * | 7/2008 | Visco et al. | 429/50 |
| 2008/0220318 A1 | 9/2008 | Brereton et al. | |
| 2008/0241643 A1 * | 10/2008 | Lepp et al. | 429/61 |
| 2009/0004536 A1 | 1/2009 | Knauer et al. | |
| 2009/0047570 A1 | 2/2009 | Harper | |
| 2009/0047571 A1 | 2/2009 | Harper | |
| 2009/0311559 A1 | 12/2009 | Levine et al. | |
| 2010/0003545 A1 * | 1/2010 | Horne et al. | 429/12 |
| 2010/0003586 A1 | 1/2010 | Sahu | |
| 2010/0021805 A1 | 1/2010 | Winter | |
| 2010/0136455 A1 | 6/2010 | Winter | |
| 2011/0311896 A1 | 12/2011 | Harper | |

FOREIGN PATENT DOCUMENTS

| | | |
|---|---|---|
| AU | 85862/91 | 10/1991 |
| EP | 0 246 649 A1 | 11/1987 |
| EP | 0 517 217 A1 | 12/1992 |
| EP | 0 566 019 A1 | 10/1993 |
| EP | 0814527 A2 | 12/1997 |
| EP | 0 889 571 A2 | 1/1999 |
| EP | 1284513 A1 | 2/2003 |
| EP | 1385226 A1 | 1/2004 |
| EP | 1 536 506 A1 | 6/2005 |
| FR | 2.034.755 | 12/1970 |
| GB | GB2030349 A | 4/1980 |
| GB | GB2085475 A | 4/1982 |
| JP | 54/138502 | 10/1979 |
| JP | 56/42970 A | 4/1981 |
| JP | 57/9072 A | 1/1982 |
| JP | 57/9073 A | 1/1982 |
| JP | 60/225366 A | 11/1985 |
| JP | 63069151 A | 3/1988 |
| JP | 07153477 A | 12/1993 |
| JP | 7/14617 A | 1/1995 |
| JP | 7/192776 A | 7/1995 |
| JP | 8/7913 A | 1/1996 |
| JP | 8/19179 A | 1/1996 |
| JP | 9283169 A | 10/1997 |
| JP | 11/299106 A | 10/1999 |
| JP | 200317763 | 11/2003 |
| JP | 2004/319341 A | 11/2004 |
| WO | WO 89/05363 | 6/1989 |
| WO | WO 89/05528 A1 | 6/1989 |
| WO | WO9003666 A1 | 4/1990 |
| WO | WO 95/12219 A1 | 5/1995 |
| WO | WO9939397 A1 | 8/1999 |
| WO | WO 99/50945 A1 | 10/1999 |
| WO | WO 03/092109 A1 | 11/2003 |
| WO | WO 2004/054065 A1 | 6/2004 |
| WO | WO 2006/089415 A1 | 2/2006 |
| WO | WO2006081514 A2 | 8/2006 |
| WO | WO2006129635 A1 | 12/2006 |
| WO | WO 2010/118060 A1 | 4/2010 |

(56) References Cited

FOREIGN PATENT DOCUMENTS

| WO | WO 2011/114094 A1 | 9/2011 |
|---|---|---|
| WO | WO 2011/154306 A2 | 12/2011 |
| WO | WO 2011/154306 A3 | 12/2011 |

OTHER PUBLICATIONS

Office Action mailed May 10, 2013, for U.S. Appl. No. 12/820,972, filed Jun. 22, 2010.

Office Action for U.S. Appl. No. 12/820,972, filed Jun. 22, 2010 and mailed from the USPTO on Dec. 20, 2012, 22 pgs.

Close, Tullis; "Energy storage—a key technology for global energy sustainability", Journal of Power Sources 100, Feb. 17, 2001 (16 pgs.).

Shigematsu, T.; Kumamoto T.; Deguchi, H.; and Hara, T.; "Applications of a Vanadium Redox-Flow Batter to Maintain Power Quality", Sumitomo Electric Industries, Ltd., IEEE 2002 (6 pgs.).

Barton, John P. and Infield, David G.; Énergy Storage and Its Use with Intermittent Renewable Energy, IEEE Transactions on Energy Conversion, vol. 19, No. 2, Jun. 2004 (8 pgs.).

Hagedorn, Mark, et al., "NASA Redox Cell Stack Shunt Current, Pumping Power, and Cell Performance Tradeoffs," National Aeronautics and Space Administration, Lewis Research Center, Feb. 1982, 30 pgs.

Hawkins, J.M, et at., "A field of a Vanadium Energy Storage System," INTELC 2001, Oct. 2001, pp. 652-656, Conference Publication No. 484.

"Flow Battery," Flow Battery Solutions, Mar 15, 2013, <http://www.arbin.com/ products/flow-battery?gclid=CKvNqLXD7bUCFed1Ogod-jcAkQ>.

International Search Report and Written Opinion for PCT/US2011/060526 filed Nov. 14, 2011 and mailed May 16, 2012, 8 pgs.

IPRP for PCT/US2011/060526 filed Nov. 14, 2011, and mailed from IB on Jun. 25, 2013, 5 pgs.

Office Action for U.S. Appl. No. 11/234,778 from USPTO mailed Sep. 19, 2007, 16 pgs.

Bartolozzi, M., "Development of Redox Flow Batteries. A Historical Bibliography," Journal of Power Sources, 27 (1989), pp. 219/234.

Sum, et al., "A Study of the V(II)/V(III) Redox Couple for Redox Flow Cell Applications," Journal of power Sources, 15 (1985), pp. 179/190.

Skyllas/Kazacos et al., "Characteristics and performance of 1 kW UNSW vanadium redox battery," Journal of Power Sources, 35 (1991) pp. 399/404.

Skyllas/Kazacos et al., "Vanadium redox battery prototype: design & development," University of New South Wales, Department of Minerals and Energy, Jan. 1991, 254 pgs.

Skyllas/Kazacos et al., "Development of Redox Cell for Remote Area Energy Storage," School of Chemical Engineering & Industrial Chemistry, University of New South Wales, 200 pgs.

Kazacos et al., "Vanadium redox cell electrolyte optimization studies," Journal of Applied Electrochemistry, 1990, 20, pp. 463/467.

Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, The University of New South Wales, Feb. 1989, 250 pgs.

Definition of "Load" retrieved from Dictionary.com on Aug. 12, 2010.

Definition of "Electrical Power" retrieved from Dictionary.com on Aug. 12, 2010.

Liu, Galasco, and Savinell, "Enhancing Performance of the Ti(III)/Ti(IV) Couple for Redox Battery Applications," Journal of Electrochemical Society, 1981, downloaded Feb. 6, 2012, pp. 1755/1757.

Chen et al., "Solution Redox Couples for Electrochemical Energy Storage," Journal of Electrochemical Society Energy Storage (128), downloaded Feb. 6, 2012, pp. 1460/1467.

Chen et al., "Solution Redox Couples for Electrochemical Energy Storage," Journal of Electrochemical Society Energy Storage (1982), 129(1), downloaded Feb. 6, 2012, pp. 61/66.

Murthy et al., "Fe(III)/Fe(II)—Ligand Systems for Use as Negative Half/Cells in Redox/Flow Cells," Journal of Power Sources, 1989, 27(2), pp. 119/126.

6001 Chemical Abstract, 1989, No. 22, 111:198495s, printed Feb. 6, 2012, 2 pgs.

\* cited by examiner

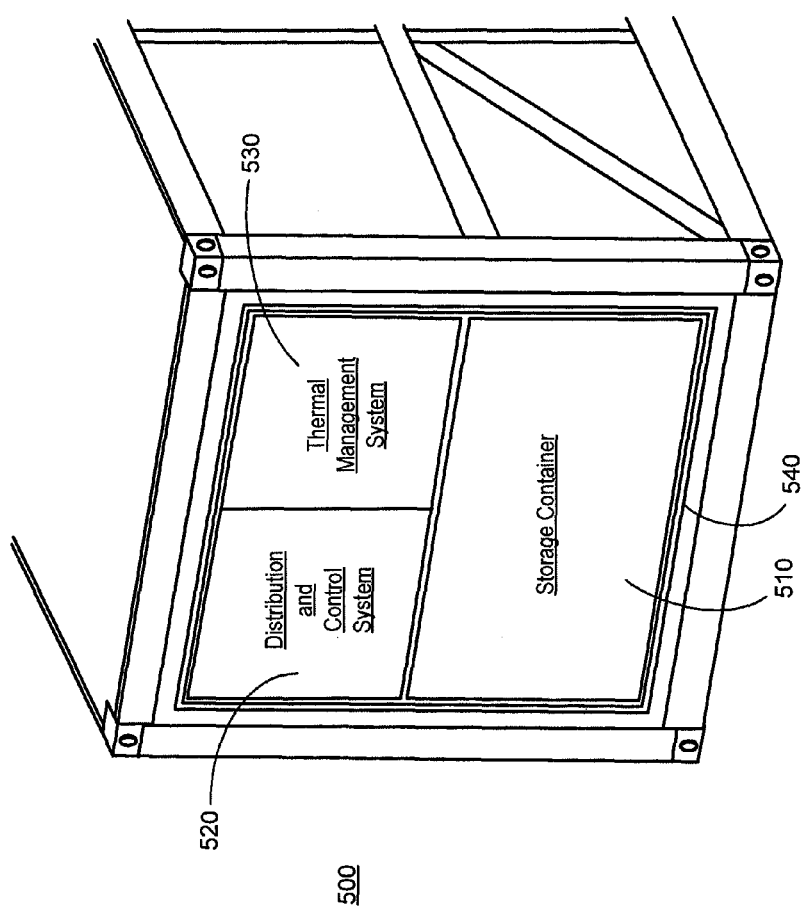

SYSTEMS AND METHODS FOR REDOX FLOW BATTERY SCALABLE MODULAR REACTANT STORAGE

TECHNICAL FIELD

This disclosure relates to redox flow battery systems and, more particularly, to redox flow battery systems having modular reactant storage capabilities.

BRIEF DESCRIPTION OF THE DRAWINGS

Non-limiting and non-exhaustive embodiments of the disclosure are described, including various embodiments of the disclosure with reference to the figures, in which:

FIG. 5 illustrates a block diagram of a modular reactant storage reservoir consistent with embodiments disclosed herein.

DETAILED DESCRIPTION

Figure 1:
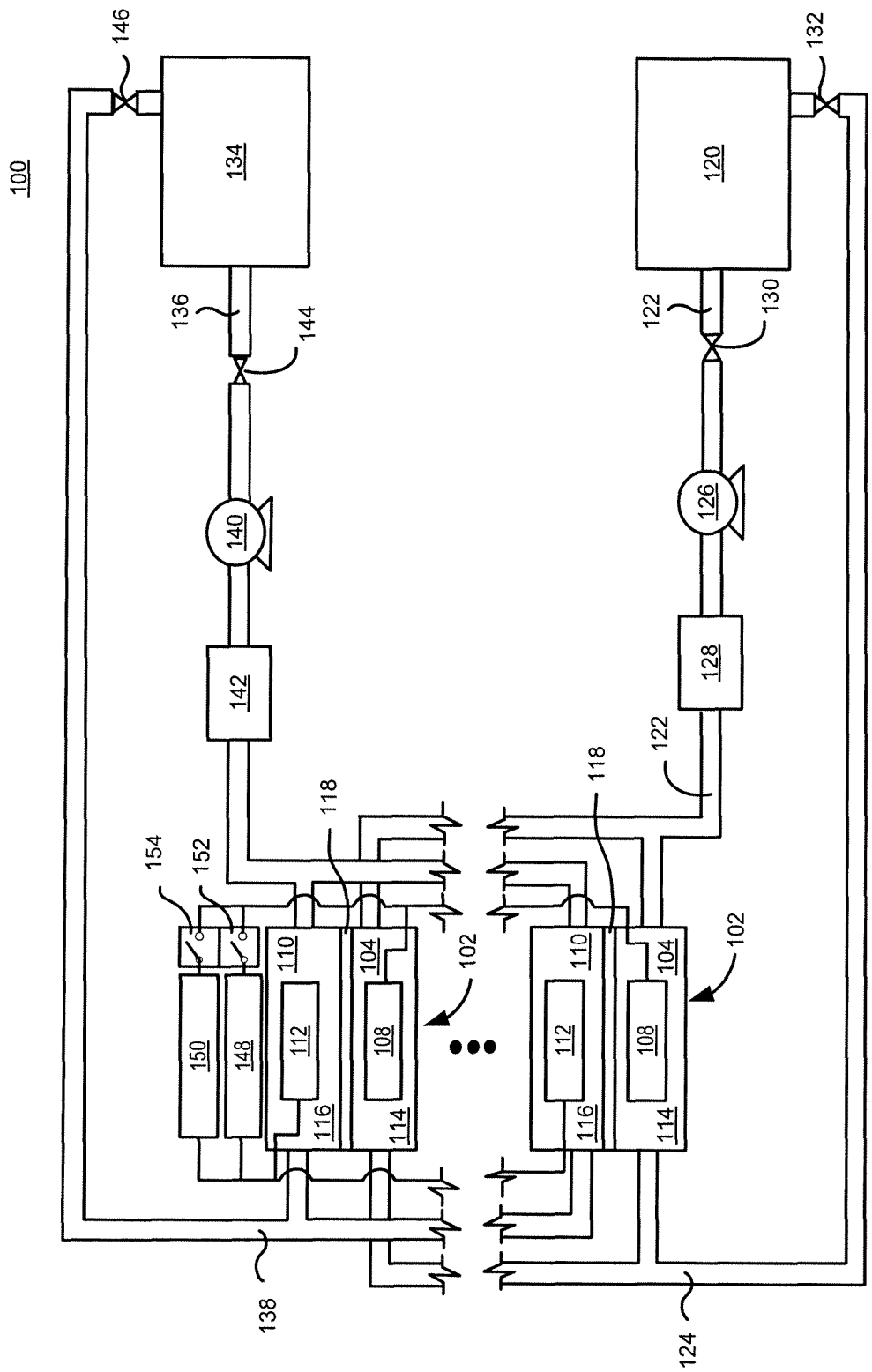
FIG. 1 illustrates a block diagram of a redox battery energy storage system consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Energy storage systems such as rechargeable batteries are an important part of electrical power systems, particularly electrical power systems supplied by wind turbine generators, photovoltaic cells, or the like. Energy storage systems may also be utilized to enable energy arbitrage for selling and buying power during off peak conditions, as uninterruptible power sources (UPS), in power quality applications, and to provide backup power. Redox flow battery energy storage systems and, particularly, vanadium redox flow battery energy storage systems (VRB-ESS), may be used in such electrical power systems. A redox flow battery energy storage system may respond quickly to changing loads, as is conventionally required in UPS and power quality applications, and may further be configured to have a large capacity, as is conventionally required in energy arbitrage and backup power applications.

A redox flow battery energy storage system generates electrical power by passing anolyte and catholyte electrolyte solutions through reactor cells. Anolyte and catholyte solutions may be collectively described herein as reactants or reactant electrolytes. A redox flow battery energy storage system may include one or more reactor cells depending on the power demands of the system and, consistent with embodiments disclosed herein, may utilize varying amounts of electrolyte solution based on the energy capacity needs of the system. In certain embodiments, the number and cross-sectional area of the reactors cells within the redox flow battery energy storage system may determine the amount of instantaneous power the system is capable of producing. Further, the volume of anolyte and catholyte electrolytic solutions available to the redox flow battery energy storage system may determine its power storage and production capacity.

FIG. 1 illustrates a block diagram of a redox flow battery energy storage system 100 and, more specifically, a VRB-ESS, consistent with embodiments disclosed herein. The redox flow battery energy storage system 100 may include one or more reactor cells 102 each having a negative compartment 104 with a negative electrode 108 and a positive compartment 110 with a positive electrode 112. The negative compartment 104 may include an anolyte solution 114 in electrical communication with the negative electrode 108. In certain embodiments, the anolyte solution 114 is an electrolyte containing specified redox ions which are in a reduced state and are to be oxidized during the discharge process of a cell 102, or are in an oxidized state and are to be reduced during the charging process of a cell 102, or which are a mixture of these latter reduced ions and ions to be reduced. The positive compartment 110 contains a catholyte solution 116 in electrical communication with the positive electrode 112. The catholyte solution 116 is an electrolyte containing specified redox ions which are in an oxidized state and are to be reduced during the discharge process of a cell 102, or an in a reduced state and are to be oxidized during the charging process of the cell 102, or which are a mixture of these oxidized ions and ions to be oxidized. In certain embodiments, the anolyte and catholyte solutions 114, 116 may be prepared consistent with the disclosure of U.S. Pat. Nos. 4,786,567, 6,143,433, 6,468,688, and 6,562,514, which are herein incorporated by reference in their entireties, or by other known techniques. While the redox flow battery energy storage system illustrated in FIG. 1 is described herein for illustrative purposes as being a Vanadium-based system, other reactant solutions may be utilized.

Each cell 102 of the redox flow battery energy storage system 100 may include an ionically conducting separator 118 (e.g., a membrane) disposed between the positive and negative compartments 104, 110 and in contact with the anolyte and catholyte solutions 114, 116 to provide ionic communication therebetween. In certain embodiments, the separator 118 may serve as a proton exchange membrane and may include a carbon material.

In some embodiments, additional anolyte solution 114 may be held in an anolyte storage reservoir 120 that is in fluid communication with the negative compartment 104 through an anolyte supply line 122 and an anolyte return line 124. The anolyte storage reservoir 120 may include a tank, bladder, or any other similar storage container. The anolyte supply line 122 may communicate with a pump 126 and a heat exchanger 128. The pump 126 may enable fluid movement of the anolyte solution 114 through the anolyte reservoir 120 supply line 122, negative compartment 104, and return line 124. In some embodiments, the pump 126 may have a variable speed to allow variance in the generated flow rate. The heat exchanger 128 may be configured to transfer heat generated from the anolyte solution 114 to a fluid or gas medium. In some embodiments, the supply line 122 may include one or more supply line valves 130 to control the volumetric flow of the anolyte solution 114. The return line 124 may communicate with one or more return line valves 132 that control the return volumetric flow.

In some embodiments, additional catholyte solution 116 may be held in a catholyte storage reservoir 134 that is in fluid communication with the positive compartment 110 through a catholyte supply line 136 and a catholyte return line 138. The catholyte supply line 136 may communicate with a pump 140 and a heat exchanger 142. The pump 140, which in some embodiments may be a variable speed pump to allow variance in the generated flow rate, may enable fluid movement of the catholyte solution 116 through the catholyte reservoir 134, supply line 136, positive compartment 110, and return line 138. The heat exchanger 142 may be configured to transfer heat generated from the catholyte solution 116 to a fluid or gas medium. In some embodiments, the supply line 136 may include one or more supply line valves 144 to control the volumetric flow of catholyte solution 116. The return line 138 may communicate with one or more return line valves 146 that control the return volumetric flow.

The negative and positive electrodes 108, 112 may be in electrical communication with a power source 148 and a load 150. A power source switch 152 may be disposed in series between the power source 148 and each negative electrode 108. Likewise, a load switch 154 may be disposed in series between the load 150 and each negative electrode 108. Alternative configurations are possible, and the specific configuration of the redox flow battery energy storage system 100 illustrated in FIG. 1 is provided as an exemplary configuration of many possible configurations consistent with embodiments disclosed herein.

While the redox flow battery energy storage system 100 is charging, the power source switch 152 may be closed and the load switch 154 may be opened. Pump 128 may pump the anolyte solution 114 through the negative compartment 104 and anolyte storage reservoir 120 via anolyte supply and return lines 122, 124. Simultaneously, pump 140 may pump the catholyte solution 116 through the positive compartment 110 and catholyte storage reservoir 134 via catholyte supply and return lines 136, 138. Each cell 102 of the redox flow battery energy storage system 100 may be charged by delivering electrical energy from the power source 148 to negative and positive electrodes 108, 112, by, for example, deriving divalent vanadium ions in the anolyte solution 104 and equivalent vanadium ions in the catholyte solution 110.

Electricity may be drawn from each reactor cell 102 of the redox flow battery energy storage system 100 by closing load switch 154 and opening power source switch 152. This causes the load 150, which is in electrical communication with negative and positive electrodes 108, 112, to withdraw electrical energy when anolyte and catholyte solution is pumped respectively through the cell 102. In certain embodiments, operation of the various components of the redox flow battery energy storage system 100 may be controlled by an electronic control and monitoring system (not shown). Further, power withdrawn from the redox flow battery energy storage system 100 may be conditioned using power conditioning equipment (not shown) prior to being provided to the load 150. In certain embodiments, a power conversation system (not shown) may also be incorporated to convert DC power output from the reactor cell 102 to AC power required by the load 154.

Figure 2:
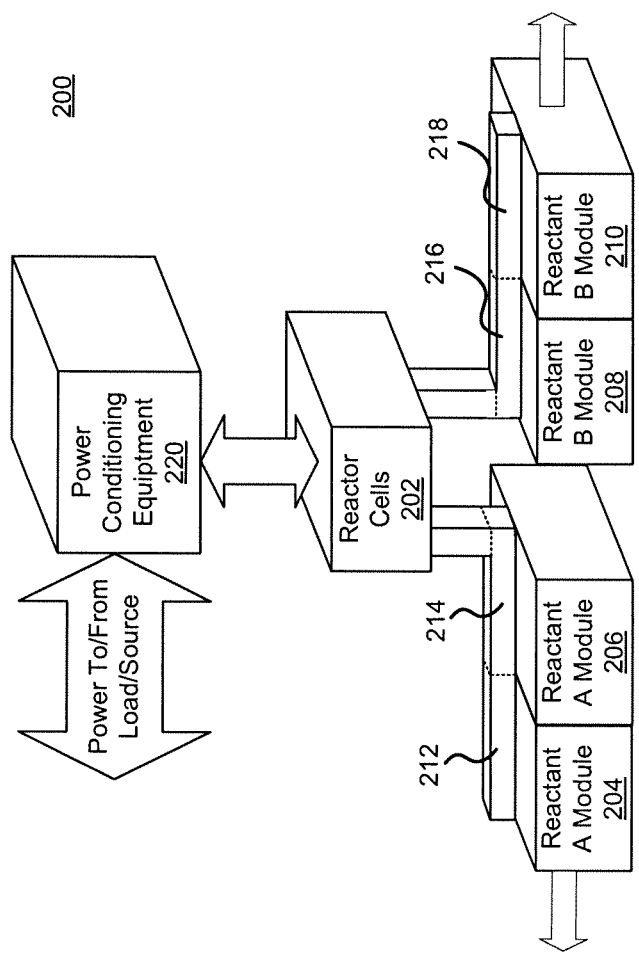
FIG. 2 illustrates a block diagram of a redox battery energy storage system including scalable modular reactant storage consistent with embodiments disclosed herein.
Figure 3A:
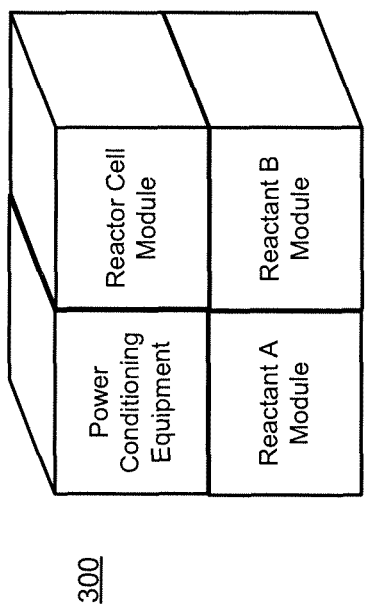
FIG. 3A illustrates a block diagram of an exemplary configuration of a redox battery storage system including scalable modular reactant storage consistent with embodiments disclosed herein.
Figure 3B:
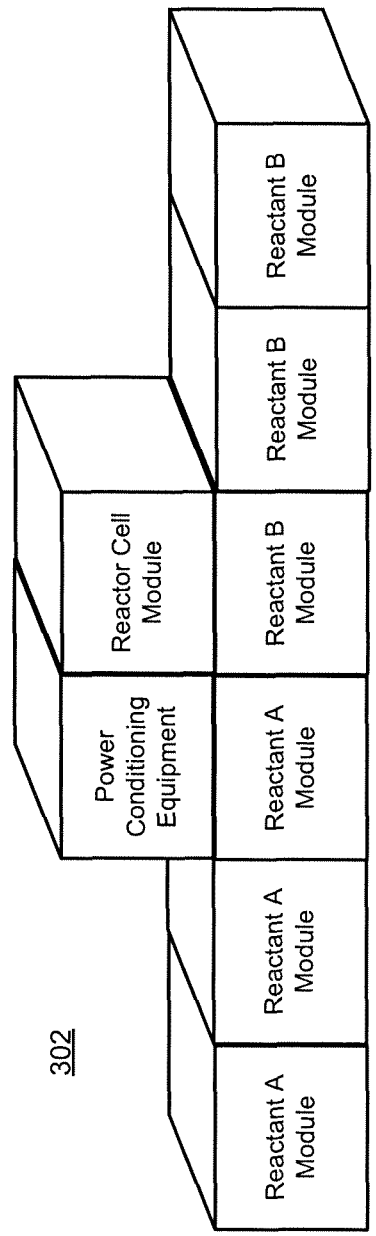
FIG. 3B illustrates a block diagram of an exemplary configuration of a redox battery storage system including scalable modular reactant storage consistent with embodiments disclosed herein.
Figure 3C:
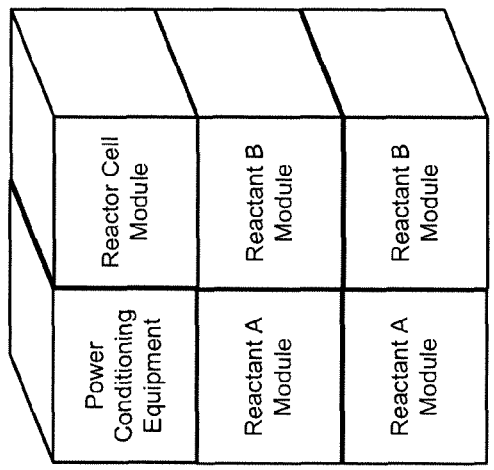
FIG. 3C illustrates a block diagram of an exemplary configuration of a redox battery storage system including scalable modular reactant storage consistent with embodiments disclosed herein.
Figure 3D:
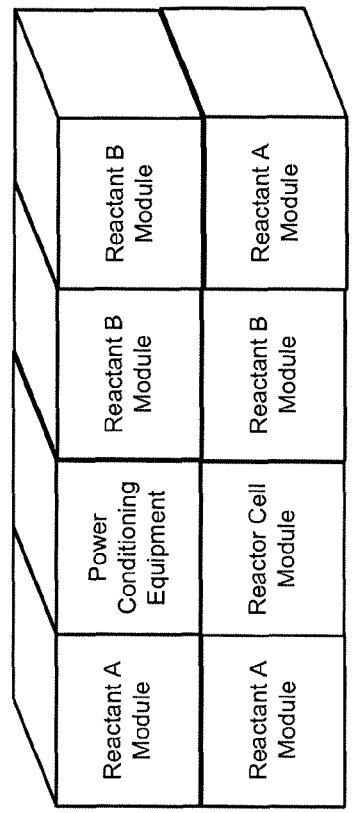
FIG. 3D illustrates a block diagram of an exemplary configuration of a redox battery storage system including scalable modular reactant storage consistent with embodiments disclosed herein.

FIG. 2 illustrates a block diagram of a redox flow battery energy storage system 200 including scalable modular reactant storage 204-210 consistent with embodiments disclosed herein. The redox flow battery energy storage system 200 includes a reactor cell module 202 housing one or more reactor cells each having a negative compartment with a negative electrode and a positive compartment with a positive electrode, as described above in reference to the redox flow battery energy storage system 100 of FIG. 1. Consistent with embodiments disclosed herein, the redox flow battery energy storage system 200 may further include one or more modular reactant storage reservoirs 204-210 used to store electrolyte reactants (e.g., anolyte and catholyte). For example, modular reactant storage reservoirs 204, 206 may store an anolyte (i.e., Reactant A) and modular reactant storage reservoirs 208-210 may store a catholyte (i.e., Reactant B). In some embodiments, the modular reactant storage reservoirs may utilize tanks, bladders, or other similar storage containers for reactant storage. By utilizing the modular reactant storage reservoirs 204-210, the reactant storage capacity of the redox flow battery energy storage system 200 may be scalable (e.g., expanded or reduced) based on system requirements including, for example, required system discharge times and energy storage capacities.

Modular reactant storage reservoirs 204-210 may be associated with modular distribution piping 212-218 configured to provide fluid communication between reactant electrolyte (e.g., anolyte or catholyte) stored in tanks included in the modular reactant storage reservoirs 204 and the reactor cells 202, thereby enabling operation of the redox flow battery energy storage system 200 similar to that described in reference to FIG. 1. In some embodiments, modular distribution piping associated with a particular reactant storage reservoir may interface with other modular distribution piping to provide fluid communication of reactant electrolyte to the reactor cells 202. For example, modular distribution piping 212 associated with modular reactant storage reservoir 204 may be coupled to modular distribution piping 214 associated with modular reactant storage reservoir 206 to provide fluid communication between reactant electrolyte stored within the modular reactant storage reservoir 204 and the reactor cells 202. By utilizing modular distribution piping associated with already integrated reactant storage reservoirs, adding additional reactant storage reservoirs to the system may not require significant alterations to the existing reactant distribution piping aside from that associated with interfacing the distribution piping of the additional storage reservoir to that of an existing storage reservoir, thereby allowing for scalability of the system.

In certain embodiments, a centralized distribution piping system (not shown) such as a centralized manifold piping system may be used in conjunction with modular distribution piping 212-218. For example, modular distribution piping 212 may interface with a centralized distribution piping system to fluid communication of reactant electrolyte from storage reservoir 204 to the reactor cells 202. Other modular distribution piping 214-218 may be similarly configured. In certain embodiments, modular distribution piping (e.g., modular distribution piping 212) associated with a particular reactant storage reservoir (e.g., modular reactant storage reservoir 204) may be configured to be in direct fluid communication with reactor cells 202 without interfacing with modular distribution piping associated with a different storage reservoir and/or a centralized distribution piping system. In certain embodiments, reactant in storage reservoirs 204-210 may be in fluid communication with the reactor cells 202 in a parallel configuration, a series configuration, or any combination thereof.

Consistent with the general operation of a redox flow battery energy storage system described in reference to FIG. 1, reactor cells 202 may provide power to a load during discharge or receive power from a source during charging. Power provided to a load or received from a source may be conditioned using power conditioning equipment 220. In some embodiments, the power conditioning equipment 220 may be integrated into the redox flow battery energy storage system 200 modularly similar to the reactant storage reservoirs 204-210.

Modular reactant storage reservoirs 204-210 may include a discrete enclosure (e.g., a frame with a weather proofing exterior and the like), thereby reducing the need to construct an enclosure, building, or shelter to house the entire redox flow battery energy storage system 200 and easing the scaling of the reactant storage capacity of redox flow battery energy storage system 200 based on system requirements. In some embodiments, modular reactant storage reservoirs 204-210 may each include a thermal management system configured to manage thermal conditions within the modular reactant storage reservoir they are associated with, thereby reducing the need to construct an entire redox flow battery energy storage system 200 thermal management system or construct an enclosure for the entire system that includes, chilling, heating, ventilation, and/or air conditioning capabilities. In other embodiments, the thermal management system may be configured to manage thermal conditions within more than one modular reactant storage reservoir. Modular reactant storage reservoirs 204-210 and/or reactor cells 202 may further include an enclosure configured to contain leaks and/or spills of reactant within the reservoirs and/or reactor cells.

In certain embodiments, modular reactant storage reservoirs 204-210 may include internal pumping mechanisms (not shown) to enable fluid communication between the modular reactant storage reservoirs 204-210 and the reactor cells 202 when the redox flow battery energy storage system 200 is operating. Internal pumping mechanisms may include pumps, values, piping, and the like. In other embodiments, more centralized pumping mechanisms (i.e., mechanisms not included in each of modules 204-206) may be used by the redox flow battery energy storage system 200 to enable fluid communication between one or more of the storage reservoirs 204-210 and reactor cells 202. The modular reactant storage reservoirs 204-210 may also include a system (not shown) which monitors and manages pump and valve control within the individual reservoirs 204. In some embodiments, this system may include electrical control components (e.g., sensors, control lines, and the like). Like the modular distribution piping, the modular monitoring and control system may be associated with individual modules, allowing for scalability of the system without significant alterations to existing monitoring and control systems associated with interfacing a monitoring and control systems associated with a new (i.e., additional) reservoir to that of an existing reservoir. In certain embodiments, a centralized system (not shown) for managing and controlling internal pumping mechanisms of the individual reservoirs 204-210 may manage pump and valve control in conjunction with or in lieu of pump and value control systems associated with individual reservoirs 204.

FIGS. 3A-3D illustrate block diagrams of exemplary configurations of redox flow battery energy storage systems 300-306 including scalable modular reactant storage consistent with embodiments disclosed herein. The redox flow battery energy storage systems 300-306 may include modular reactor cells, power conditioning equipment, and reactant storage reservoirs (e.g., Reactant A modules and Reactant B modules). As illustrated, the modules of the redox flow battery energy storage systems 300-306 may have standard module dimensions, enabling the redox flow battery energy storage systems 300-306 to be flexibly built (e.g., stacked) and scaled in multiple configurations. The redox flow battery energy storage systems 300-306 illustrated in FIG. 3A-3D show possible configurations of a redox flow battery energy storage system 300-306 utilizing modular reactant storage modules, demonstrating examples of the flexibility and scalability allowed when designing a redox flow battery energy storage system 300-306 with the modular reactant storage modules disclosed herein.

Figure 4:
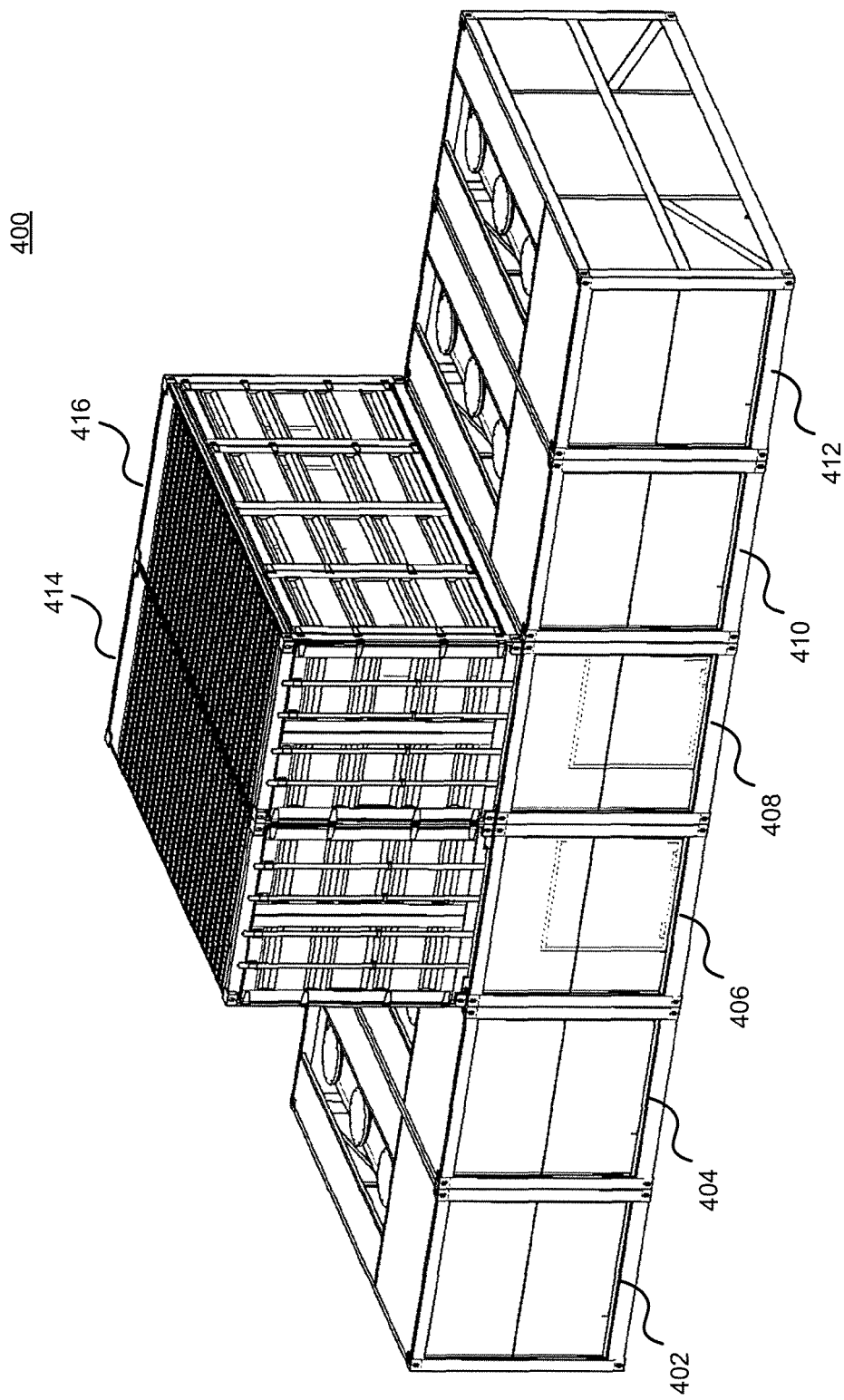
FIG. 4 illustrates a block diagram of a redox battery energy storage system including scalable modular reactant storage having standard module dimensions consistent with embodiments disclosed herein.

FIG. 4 illustrates a block diagram of a redox flow battery energy storage system 400 including scalable modular reactant storage having standard module dimensions consistent with embodiments disclosed herein. A redox flow battery energy storage system 400 may include a plurality of standardized modules that include the components of a redox flow battery energy storage system described above in reference to FIG. 1. For example, a redox flow battery energy storage system 400 may include one or more reactant storage reservoirs 402-412 and one or more reactor cells 414-416. Utilizing standard module dimensions, the reactant storage reservoirs 402-412 and reactor cells 414-416 may be built and scaled in multiple configurations.

In certain embodiments, the modules of the redox flow battery energy storage system 400 may be configured to utilize standardized interface types and locations for modular reactant distribution piping (not shown). Further, the modules of the redox flow battery energy storage system 400 may be configured to utilize standard interface types and locations for pump and value monitoring and management systems (not shown) integrated in the modules. By utilizing standardized interface types and locations between the modules included in the redox flow battery energy storage system 400, the system may be flexibly scaled and/or reconfigured. For example, an additional module (e.g., a reactant storage reservoir module) may be added to the system. Standardized interfaces at the additional module and another module integrated with the existing system may interface the reactant distribution piping and monitoring and control systems of the additional module with the piping and monitoring and control systems of the existing system.

The modules 402-416 may be housed in a discrete enclosure or frame. In certain embodiments, the modules may include an intermodal container (e.g., a shipping container) or an intermodal container frame which may be modified to enclose the components of the modules 402-416. Standardized mechanical interfaces (e.g., a twistlock and corner casting) on the frames may allow modules to be rigidly secured to each other in a variety of configurations. In addition, by utilizing intermodal containers, reactant storage reservoirs modules may be shipped to a system location already filled with reactant, thereby reducing the need to fill reactant takes from different shipping tanks during system installation.

FIG. 5 illustrates a block diagram of a modular reactant storage reservoir 500 consistent with embodiments disclosed herein. The modular reactant storage reservoir 500 may include a storage container 510, such as a tank, a bladder, and/or the like. The modular reactant storage reservoir 500 may further include distribution and control systems 520, such as internal pumping mechanisms, monitoring and control systems, and/or the like. The modular reactant storage reservoir 500 may also include a thermal management system 530 configured to manage thermal conditions within the modular reactant storage reservoir 500. An enclosure 540 included in the modular reactant storage reservoir 500 may be configured to contain leaks and/or spills of reactant within the modular reactant storage reservoir 500.

Figure 6A:
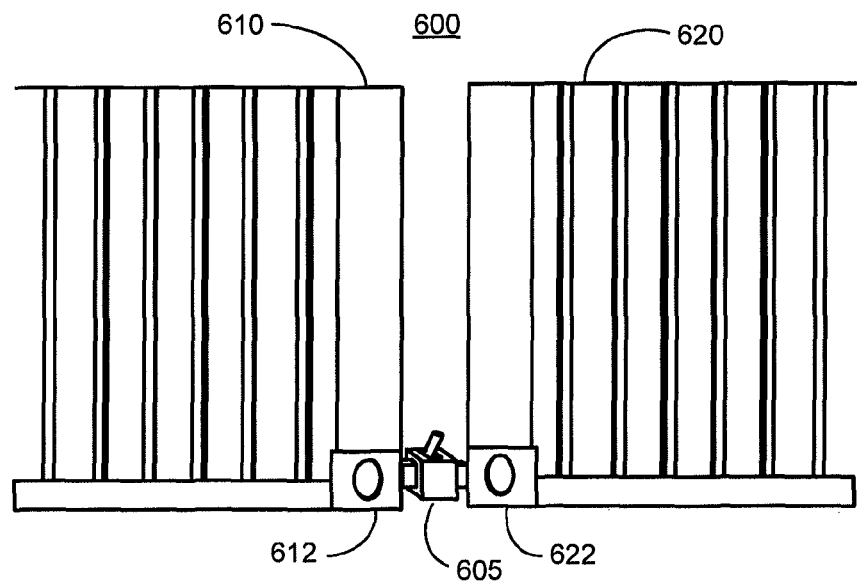
FIGS. 6A and 6B illustrate perspective and exploded views of an interface including a twist lock and corner castings for mechanically securing reactant storage modules.
Figure 6B:
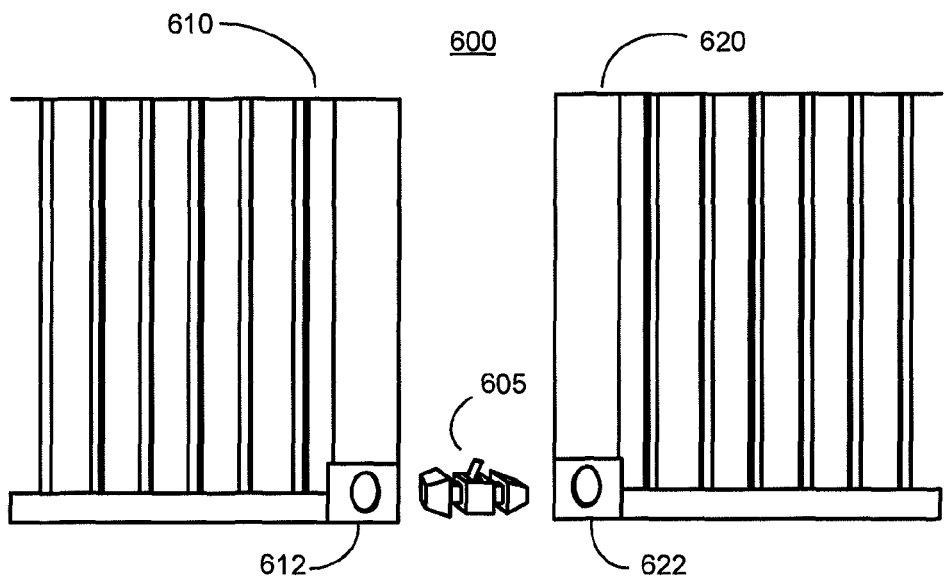

FIGS. 6A and 6B illustrate perspective and exploded views of an interface 600 including a twist lock 605 and corner castings 612, 622 for mechanically securing reactant storage modules 610, 620. Each reactant storage module 610, 620 may include a plurality of corner castings 612, 622. The reactant storage modules 610, 620 may be secured to each other in a variety of configurations by securing one or more of the corner castings 612, 622 on the first reactant storage module 610 to the second reactant storage module 620.

Many changes may be made to the details of the above-described embodiments without departing from the underlying principles of this disclosure. The scope of the present invention should, therefore, be determined only by the following claims.

What is claimed is:

1. A redox flow battery system comprising:
a first anolyte storage module, the first anolyte storage module comprising:
a first anolyte reservoir;
a first anolyte reservoir interface configured to provide fluid communication between the first anolyte reservoir and a second anolyte reservoir included in a second anolyte storage module, wherein the first anolyte reservoir interface is located for direct coupling with a second anolyte reservoir interface included in the second anolyte storage module, and wherein the first anolyte reservoir interface is directly coupled to the second anolyte reservoir interface; and
an enclosure comprising a mechanical interface, wherein the first anolyte reservoir is disposed within the enclosure, and wherein the mechanical interface secures the first anolyte storage module directly to the second anolyte storage module;
a first catholyte storage module, the first catholyte storage module comprising a first catholyte reservoir and a first catholyte reservoir interface configured to provide fluid communication between the first catholyte reservoir and a second catholyte reservoir included in a second catholyte storage module, wherein the first catholyte reservoir interface is directly coupled to a second catholyte reservoir interface included in the second catholyte storage module; and
a cell comprising a negative compartment in fluid communication with the first anolyte reservoir and a positive compartment in fluid communication with the first catholyte reservoir,
wherein the first and second anolyte storage modules are configured to be interchangeable modular components and the first and second catholyte storage modules are configured to be interchangeable modular components.

2. The redox flow battery system of claim 1, wherein the second anolyte storage module and the first and second catholyte storage modules each comprise an enclosure, the second anolyte reservoir and the first and second catholyte reservoirs being disposed within the respective enclosure.

3. The redox flow battery system of claim 1, wherein the enclosure of the first anolyte storage module comprises a rigid frame.

4. The redox flow battery system of claim 1, wherein the enclosure of the first anolyte storage module comprises an intermodal container.

5. The redox flow battery system of claim 1, wherein the enclosure of the first anolyte storage module comprises an intermodal container frame.

6. The redox flow battery system of claim 1, wherein the redox flow battery system is a vanadium redox flow battery system.

7. The redox flow battery system of claim 2, wherein the enclosure of the first anolyte storage module is configured to be stackable with the enclosure of the second anolyte storage module.

8. The redox flow battery system of claim 1, wherein the first anolyte storage module comprises first modular distribution piping configured to provide fluid communication between the first anolyte reservoir and the negative compartment.

9. The redox flow battery system of claim 8, wherein the first anolyte storage module comprises a first pump and valve system configured to control fluid communication between the first anolyte reservoir and the negative compartment.

10. The redox flow battery system of claim 1, wherein the second anolyte storage module comprises second modular distribution piping configured to provide fluid communication between the second anolyte reservoir and the first anolyte reservoir via the first and second anolyte reservoir interfaces.

11. The redox flow battery system of claim 10, wherein the second anolyte storage module comprises a second pump and valve system configured to control fluid communication between the second anolyte reservoir and the first anolyte reservoir.

12. The redox flow battery system of claim 1, wherein the first catholyte storage module comprises third modular distribution piping configured to provide fluid communication between the first catholyte reservoir and the positive compartment.

13. The redox flow battery system of claim 12, wherein the first catholyte storage module comprises a third pump and valve system configured to control fluid communication between the first catholyte reservoir and the positive compartment.

14. The redox flow battery system of claim 1, wherein the second catholyte storage module comprises fourth modular distribution piping configured to provide fluid communication between the second catholyte reservoir and the first catholyte reservoir via the first and second catholyte reservoir interfaces.

15. The redox flow battery system of claim 14, wherein the second catholyte storage module comprises a fourth pump and valve system configured to control fluid communication between the second catholyte reservoir and the first catholyte reservoir.

16. The redox flow battery system of claim 1, wherein the first and second anolyte storage modules and the first and second catholyte storage modules each comprise a thermal management system.

17. The redox flow battery system of claim 1, wherein the first and second anolyte storage modules and the first and second catholyte storage modules each comprise a spill containment system.

18. The redox flow battery system of claim 1, wherein the system further comprises the second catholyte storage module, wherein the second catholyte reservoir of the second catholyte storage module is configured to be in fluid communication with the first catholyte reservoir via the first and second catholyte reservoir interfaces.

19. The redox flow battery system of claim 1, wherein the system further comprises the second anolyte storage module, wherein the second anolyte reservoir of the second anolyte storage module is configured to be in fluid communication with the first anolyte reservoir via the first and second anolyte reservoir interfaces.

* * * * *